United States Patent
Schilp et al.

(10) Patent No.: US 8,794,877 B2
(45) Date of Patent: Aug. 5, 2014

(54) DEVICE FOR NON-CONTACT TRANSPORTING AND HOLDING OF OBJECTS OR MATERIAL

(75) Inventors: Michael Schilp, Regensburg (DE); Josef Zimmermann, Regensburg (DE); Adolf Zitzmann, Teunz (DE)

(73) Assignee: Zimmerman & Schilp Handhabungstechnik GmbH, Regensburg (DE)

( * ) Notice: Subject to any disclaimer, the term of this patent is extended or adjusted under 35 U.S.C. 154(b) by 727 days.

(21) Appl. No.: 12/595,359

(22) PCT Filed: Apr. 9, 2008

(86) PCT No.: PCT/DE2008/000595
§ 371 (c)(1),
(2), (4) Date: May 24, 2010

(87) PCT Pub. No.: WO2008/122283
PCT Pub. Date: Oct. 16, 2008

(65) Prior Publication Data
US 2011/0311320 A1    Dec. 22, 2011

(30) Foreign Application Priority Data
Apr. 9, 2007 (DE) .................... 10 2007 016 840

(51) Int. Cl.
*B65G 54/00* (2006.01)
(52) U.S. Cl.
CPC ........................... *B65G 54/00* (2013.01)
USPC ................ 406/86; 198/630; 181/0.5
(58) Field of Classification Search
USPC .............. 198/630; 406/86; 181/0.5
See application file for complete search history.

(56) References Cited

U.S. PATENT DOCUMENTS

| | | | |
|---|---|---|---|
| 5,810,155 A | 9/1998 | Hashimoto et al. | |
| 6,609,609 B2 * | 8/2003 | Takasan et al. | 198/630 |
| 6,637,585 B2 * | 10/2003 | Takasan et al. | 198/752.1 |
| 6,779,650 B2 * | 8/2004 | Takasan et al. | 198/630 |
| 6,802,220 B2 * | 10/2004 | Takasan et al. | 73/570.5 |
| 6,994,207 B2 * | 2/2006 | Takasan et al. | 198/752.1 |
| 7,260,449 B2 * | 8/2007 | Zimmermann et al. | 700/229 |
| 7,870,946 B2 * | 1/2011 | Zimmermann et al. | 198/630 |

FOREIGN PATENT DOCUMENTS

| | | |
|---|---|---|
| DE | 199 16 872 | 4/2000 |
| DE | 199 16 922 | 10/2000 |
| DE | 199 16 923 | 10/2000 |
| DE | 199 16 859 | 1/2001 |
| WO | WO 2004/076320 | 9/2004 |

* cited by examiner

Primary Examiner — William R Harp
(74) Attorney, Agent, or Firm — Henry M Feiereisen LLC

(57) ABSTRACT

The present invention relates to a device for transporting and holding of touch-sensitive structural elements or materials, the device comprising the following features: At least an oscillatory plate-like take-up 2 for receiving the object to be transported or held, on which at least an oscillation generator 3 is fixed, and at least two supporting members 4, wherein the oscillation generator 3 is arranged on the plate-like take-up 2 at a predetermined position thereof to set the plate-like take-up into flexural vibrations, and the supporting members 4 are arranged at positions where the amplitude of the flexural vibration is lower than the maximum amplitude by at least 50%, and the oscillation generator 3 is operated with a frequency setting the plate-like take-up 2 into vibrations so that the structural elements or the material are (is) levitating in a contact-free way.

8 Claims, 2 Drawing Sheets

DEVICE FOR NON-CONTACT TRANSPORTING AND HOLDING OF OBJECTS OR MATERIAL

CROSS-REFERENCES TO RELATED APPLICATIONS

This application is the U.S. National Stage of International Application No. PCT/DE2008/000595, filed Apr. 9, 2008, which designated the United States and has been published as International Publication No. WO 2008/122283 and which claims the priority of German Patent Application, Serial No. 10 2007 016 840.5, filed Apr. 9, 2007, pursuant to 35 U.S.C. 119(a)-(d).

BACKGROUND OF THE INVENTION

The present invention relates to a device for non-contact transporting and holding of touch-sensitive objects or material.

Several technologies for non-contact transporting of flat objects such as structural elements, vessels or material along a transporting path or holding them in a defined position are known from prior art. For example, transport accessory equipments operated on an air cushion are widely used, wherein the air cushion is generated by a majority of air nozzles. However, these so-called air bearings comprise several disadvantages. Air or any other gas is constantly blown through the nozzles, that is, air or gas is consumed. Often, the air to be used must be cleaned beforehand so that additional expenses arise. Furthermore, air bearings are relatively sluggish with regard to their controllability and whirl up particles, which is not wanted for clean-room applications.

On principle, these disadvantages can be avoided by utilizing other technologies. A transporting device working on the principle of sound pressure is known from patent document U.S. Pat. No. 5,810,155. In this document, a transporting path whit an oscillation generator coupled thereto is described. The transporting path is energized to oscillate so that flat structural elements transferred onto it are levitated by the generated air cushion and do not contact the transporting path at any time. The technology of generating stationary waves, which merely effect that a structural element is levitating, is well known. Furthermore, technologies of generating moving waves, which effect that a structural element is moved along the transporting path, are also known.

Another constructions according to the prior art are described in the documents DE 19916922, DE 19916923, DE 19916859 and DE 19916872.

The devices of this kind so far described, which were used under laboratory conditions only, show that it is possible, on principle, to transport or hold a structural element on an oscillating transporting path in a non-contact way.

However, with trials carried out in practice by using such a device, considerable problems arose when the structural elements to be transported were more weighty than thin silicon wafers or similar light-weight materials, for example, which will be described as follows: The transporting path has a certain specific gravity and specific oscillating properties. When the transporting path is operated in the idle motion, that is, when no structural elements are levitating on it, the oscillatory response thereof can be calculated exactly. However, when the transporting path is differently stressed by the structural elements to be transported, the resonant conditions, and thus, the oscillatory response thereof will change permanently. This can lead to the fact that, at certain sections of the transporting path, the air cushion generated is not sufficiently thick so that the structural elements can contact the transporting path. In order to reliably prevent the transporting path from being contacted by the structural elements, the transporting path and the oscillation generator must be dimensioned so that the former is always oscillating sufficiently strong at all sections of the transporting path, even if exposed to greater stresses. However, this causes stronger oscillation generators to be used, with the result, that the equipment cost and also the cost of energy increase.

It has turned out that construction and operation of transporting devices according to the principle just described will be too costly and expensive when large-surface and more weighty structural elements such as glass plates in a size of one square meter, for example, have to be transported. In such a case, it would be necessary to arrange many oscillation generators beneath the transporting path, in series and, if need be, also in parallel. However, this would lead to remarkably higher first cost. Another problem is that the oscillation generators have to be adjusted to each other correctly in order to gain the wanted optimum oscillatory response of the transporting path. As the oscillation generators themselves are subjected to a certain aging process causing the oscillatory response thereof to be changed slightly, the oscillatory response of the transporting path must be readjusted by using a suitable automatic control. Such a control is only possible when the vibrations of the transporting path are measured continuously, so that because of the extremely high technical expenditure, this technology did not prevail.

SUMMARY OF THE INVENTION

Therefore, object of this invention is to provide a technology using sound vibrations, which is suited for transporting and holding of structural elements small in size and light-weighted, and also of such ones greater in size and more weighty.

This object is gained by a device for transporting and holding of flat objects and materials, wherein the device includes at least an oscillatory plate-like take-up for receiving the object to be transported or held, at which at least a oscillation generator is fixed, and at least two supporting members, wherein the oscillation generator is arranged at a predetermined position of the plate-like take-up in order to set the plate-like take-up into flexural vibrations, and the supporting members are arranged at positions where the amplitude of the flexural vibration is lower than the maximum amplitude by at least 50%, and the oscillation generator is operated at a frequency which sets the plate-like take-up into vibrations so that objects or materials transferred onto are levitating on a film of gas or air.

The device according to the invention, which is suited for transporting and holding of structural elements, comprises at least a oscillatory plate-like take-up. This take-up serves to bear the object to be transported or held.

At least an oscillation generator and at least two supporting members are fixed to the plate-like take-up, with the oscillation generator being arranged on the take-up at a predetermined position thereof in order to set the take-up into flexural vibrations. The supporting members are arranged at position where the amplitude of the flexural vibration is smaller than the maximum amplitude by at least 50%. The oscillation generator is operated with a frequency which sets the plate-like take-up into vibrations so that structural elements or materials transferred onto it are levitating on a film of gas or air. Such a film serves as cushion and prevents the structural elements or materials from contacting the take-up.

The object assigned will completely be solved by this invention. For example, it is possible to construct a section of a transporting path, which, being 1 meter in length and 1 meter in width and equipped with a single oscillation generator, is capable of transporting heavy-weight glass plates having weights per unit area of up to 100 kg/m². As the passive supporting fulcrums are merely mechanically fixed junctions such as screwed joints, for example, the cost for constructing such a transporting path are extremely low, compared with a device according to the prior art. In addition, the weight of such a device is remarkably reduced because the single screw couplings are more light-weighted than a vibration receiver which would have to be arranged in place of the screw coupling. Thus, with this invention, for the first time, it is possible to provide the ultrasonic levitation technology for a wide field in practice.

According to another feature of the invention, the supporting members comprise passive vibration absorbers or are formed as such ones. These vibration absorbers damp residual vibrations which sometimes can lead to non-wanted noises at the supporting fulcrums. An expert, who is experienced in the field of mechanic vibration engineering and who also has a relevant knowledge of measurement technique, can determine, based on measurements, at which positions the vibration absorbers have to be installed.

According to another feature of the invention, the supporting members comprise active oscillation generators. These oscillation generators oscillate at a frequency with which unwanted residual vibrations are compensated. This measure can become necessary when, at a few supporting fulcrums, residual vibrations occur, which hardly can be damped passively.

According to another feature of the invention, the passive vibration absorber is adjustable or controllable. With such a vibration absorber, much better damping properties can be gained. Construction of adjustable and controllable passive vibration absorbers is well known so that it is not necessary to explain it in detail.

According to another feature of the invention, the active vibration absorber is adjustable and controllable. With such a vibration absorber, much better compensation properties can be gained. Construction of adjustable and controllable passive vibration absorbers is also well known so that it is not necessary to explain it in detail.

According to another feature of the invention, the plate-like take-up is arched two-dimensionally. This is advantageous, for example, when web-like material such as paper has to be turned back, in a non-contact way.

According to another feature of the invention, the plate-like take-up is arched three-dimensionally. This is advantageous, for example, when three-dimensionally formed material such as a thin foil has to be held on the take-up in a non-contact way so that a treatment process can be carried out on the top side of foil.

According to another feature of the invention, the oscillation generator is arranged on the top side of the plate-like take-up and the supporting members are arranged on the bottom side thereof. This is advantageous when not enough construction space is available at the bottom side of the plate-like take-up. An expert certainly knows that the oscillation generator(s) has (have) to be fixed at positions where the transport of structural elements or material is not obstructed. More details are explained in the practical example described below.

BRIEF DESCRIPTION OF THE DRAWING

In the following, the invention will explained in detail by means of practical examples and schematic drawings.

DETAILED DESCRIPTION OF PREFERRED EMBODIMENTS

Figure 1:
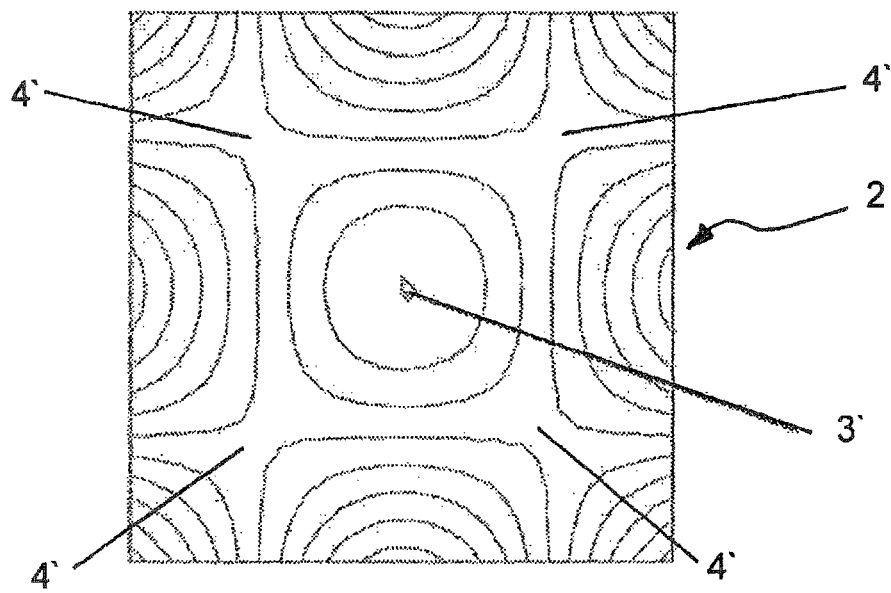
FIG. 1 is a schematic plan view of a first embodiment of the invention.
Figure 2:
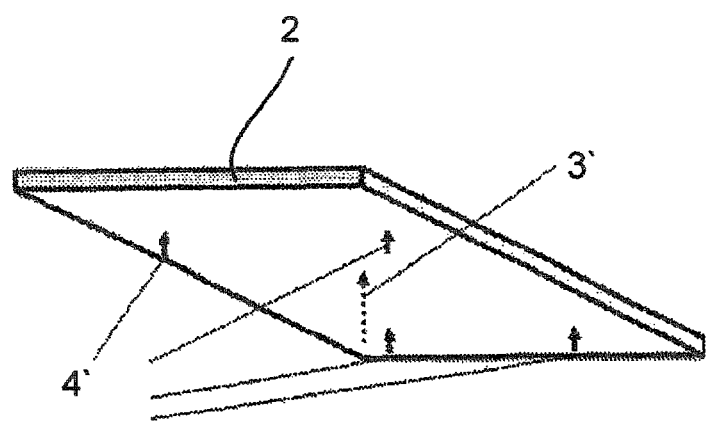
FIG. 2 is a perspective view of the first embodiment, seen from below.
Figure 3:
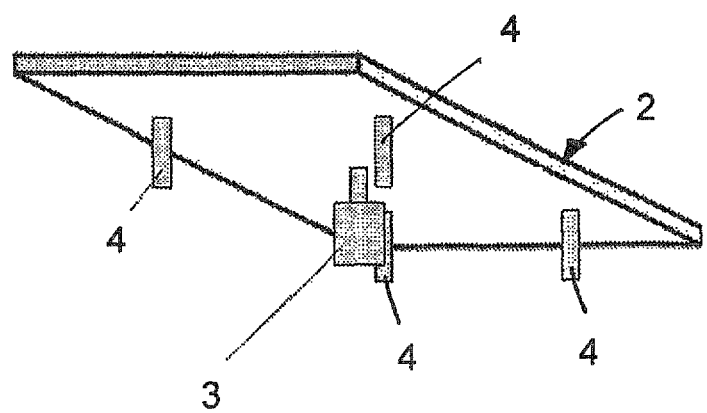
FIG. 3 is the same as FIG. 2, with the main components attached.

FIGS. 1 to 3 are schematic views of a first embodiment of the invention. A plate 2, made of an aluminium alloy AlMg4, 5MNO,7 and dimensioned 980 mm×980 mm×15 mm, is set into vibrations by an oscillation generator 3 arranged at the position 3', said vibrations having a frequency of 20 KHz. Thereby, a stationary vibration pattern is formed along the surface of the plate, which comprises maximum and minimum values of oscillation at predetermined positions. The four positions denoted by 4' mark a minimum of oscillation. At these positions, the plate 2 is fixedly mounted by means of bolts 4, which are made of plastic material. These bolts act as passive vibration absorbers.

Figure 4:
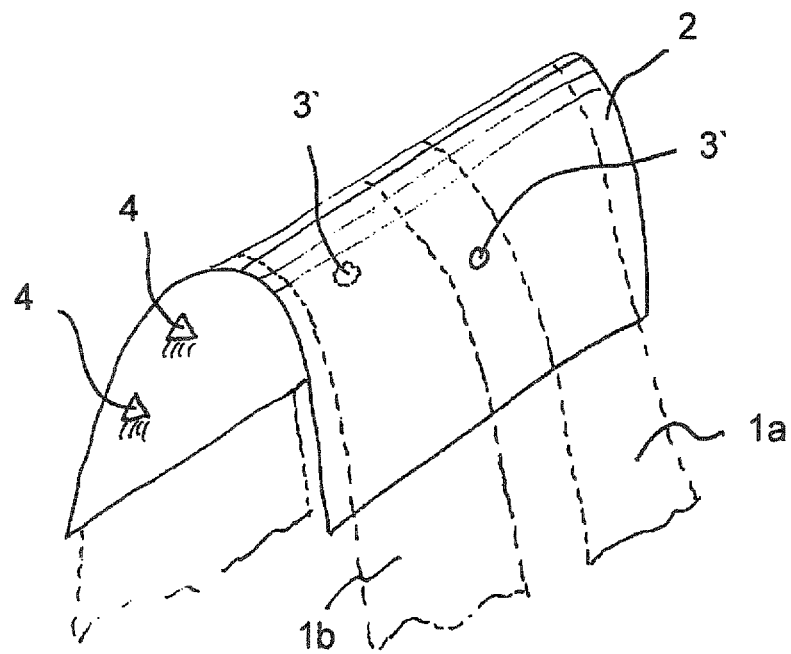
FIG. 4 is a schematic plan view of a second embodiment of the invention.

FIG. 4 is a schematic perspective view of a second embodiment of the invention. An arched plate-like take-up 2 serves to turn back two webs of foil 1a and 1b. Denoted by 3' are two excitation spots, at which the oscillator generators 3 (not shown) are fixed on the outside of take-up. Denoted by 4 are two of the supporting members (schematically shown), by which the arched plate-like take-up 2 is supported. When the arched plate-like take-up 2 is excited with a predetermined frequency, an air film is generated between the surface thereof and the webs of foil 1a, 1b so that the latter do not contact the surface of take-up.

An expert certainly knows that the selection of the suited excitation spots, the number of this spots and the suited supporting spots depends on technological parameters which can be determined by using methods also known to the expert. Also, an expert will consider parameters affecting the oscillatory properties of the device, such as the properties of the surrounding gas (air, for example).

The invention claimed is:

1. Device for transporting and holding of flat objects and materials (1), wherein the device comprises the following features:
   at least an oscillatory plate-like take-up (2) for receiving the object to be transported or held, at which
   at least a oscillation generator (3) is mechanically fixed, and
   at least two supporting members (4) which are mechanically fixedly connected with the plate-like take-up (2), wherein
   the oscillation generator (3) is arranged at a predetermined position of the plate-like take-up (2) in order to set the plate-like take-up (2) into flexural vibrations, and the supporting members (4) are arranged at positions where the amplitude of the flexural vibration is lower than the maximum amplitude by at least 50%, and
   the oscillation generator (3) is operated at a frequency which sets the plate-like take-up (2) into vibrations so that objects or materials (1) transferred onto are levitating on a film of gas or air.

2. Device according to claim 1, wherein the supporting members (4) comprise a passive vibration absorber.

3. Device according to claim 1, wherein the supporting members (4) comprise an active vibration absorber.

4. Device according to claim 2, wherein the passive vibration absorber is adjustable or controllable.

5. Device according to claim 3, wherein the active vibration absorber is adjustable or controllable.

6. Device according to any of the preceding claims, wherein the plate-like take-up (2) is arched two-dimensionally.

7. Device according to any one of claims 1 to 5, wherein the plate-like take-up (2) is arched three-dimensionally.

8. Device according to claim 1, wherein the oscillation generator (3) is arranged on a top side of the plate-like take-up (2) and the supporting members (4) are arranged on the a bottom side of the plate-like take-up (2).

\* \* \* \* \*